United States Patent
Luca et al.

(10) Patent No.: US 6,910,795 B2
(45) Date of Patent: Jun. 28, 2005

(54) OVERMOLDED LOW VOLTAGE LAMP ASSEMBLY

(75) Inventors: Dragos N. Luca, Toronto (CA); Kazuhiro Goto, Markham (CA); Andras Gyimes, Toronto (CA); Roger E. Robichaud, Newmarket (CA); Ronal Du Pont, Oakville (CA); Alan Albino, Woodbridge (CA)

(73) Assignee: Tyco Electronics Canada, Ltd., Markham (CA)

( * ) Notice: Subject to any disclaimer, the term of this patent is extended or adjusted under 35 U.S.C. 154(b) by 81 days.

(21) Appl. No.: 10/418,776

(22) Filed: Apr. 18, 2003

(65) Prior Publication Data

US 2004/0208005 A1 Oct. 21, 2004

(51) Int. Cl.⁷ .............................................. F21V 33/00
(52) U.S. Cl. ...................................... 362/555; 362/583
(58) Field of Search ................................. 362/267, 391, 362/551, 554, 555, 556, 558, 562, 573, 574, 581, 583

(56) References Cited

U.S. PATENT DOCUMENTS

| | | | | | |
|---|---|---|---|---|---|
| 3,870,878 | A | * | 3/1975 | Walter et al. | 362/364 |
| 4,329,737 | A | * | 5/1982 | Triller et al. | 362/555 |
| 4,841,415 | A | * | 6/1989 | Dobner | 362/551 |
| 5,245,519 | A | * | 9/1993 | Openiano | 362/252 |
| 5,709,457 | A | * | 1/1998 | Hara | 362/96 |
| 5,842,779 | A | * | 12/1998 | Siebert | 362/391 |
| 5,982,969 | A | * | 11/1999 | Sugiyama et al. | 362/554 |
| 6,302,570 | B1 | * | 10/2001 | Petell et al. | 362/554 |

* cited by examiner

*Primary Examiner*—Y. My Quach-Lee

(57) ABSTRACT

A low voltage lamp assembly includes a lamp housing having an illumination bore extending along an optical axis and that receives a light transmission member. A low voltage light source is situated within the bore and is axially aligned with the optical axis. A bushing is positioned within the bore and surrounds a portion of the light source. First and second wires extending from the lamp assembly for establishing an electrical connection to the light source. The wires are received by a strain relief pod separated from the lamp housing. The strain relief pod includes a current limiter therein.

19 Claims, 5 Drawing Sheets

OVERMOLDED LOW VOLTAGE LAMP ASSEMBLY

BACKGROUND OF THE INVENTION

The present invention relates generally to distributed lighting systems, and, more particularly, to distributed lighting assemblies using low voltage light sources.

Recent advances in illumination technology have resulted in the prolific use of distributed lighting assemblies in many applications. For instance, considering a modern vehicle, distributed lighting is desirable in exterior applications such as lighted running boards for entry illumination to the vehicle. Distributed lighting systems are also used to decorate engine compartment illumination, trunk illumination, and interior accent lighting. See, for example, U.S. Pat. No. 6,244,734. In addition to vehicle applications, distributed lighting assemblies are desirable for decorative, accent, and safety lighting in business, homes, and outdoor illumination of sidewalks, swimming pools, steps, etc.

Conventional, distributed light assemblies include a high intensity light source and a plurality of light transmission conduits (e.g., fiber optic cables, light pipes, and the like) for illuminating locations remote from the light source. Aside from the expense of the light source and the light transmission members, routing light from the light source to a relatively large number of remote light outputs can become unmanageable. Further, bending the light transmission conduits during installation of distributed light assemblies is problematic to uniform light transmission through the cables.

To overcome at least some of these difficulties, a plurality of light sources (e.g., incandescent bulbs, halogen lamps, and the like) have been employed with an equal plurality of light transmission members to produce distributed lighting effects. It is difficult, however, to produce even lighting from the multiple light sources, and the assemblies are not as reliable as desired. Tubular light sources (e.g., neon, fluorescent, and the like) have been utilized to produce more even lighting, but are notably disadvantaged as requiring high voltage power supply converters to operate the tubes. Additionally, tubular light sources have poor impact resistance, rendering them unsuitable for many applications.

Recent technological advances in low voltage light sources, such as light emitting diodes (LEDs), now present low voltage light sources as viable candidates as light sources for distributed lighting assemblies. Low voltage light sources operate at a small fraction of the electrical power of conventionally used light sources and are an attractive option for use in distributed lighting assemblies due to generally lower cost and higher efficiency than conventionally used light sources. Thus far, however, obtaining a reliable and even light output from low voltage light sources in a distributed lighting assembly has proven difficult.

For example, with respect to LEDs, it has proven difficult to maintain the LEDs in a proper alignment with respect to light transmission conduits to produce even lighting from a distributed lighting assembly. Additionally, providing the LEDs in a sealed, impact resistant package suitable for rugged outdoor use and demanding environments, such as vehicle applications, is challenging. Further, during assembly and installation of the lighting assemblies, electrical connections to the LED contacts tend to be compromised and/or broken. Still further, the lower power LEDs entail current limiting features to energize the LED at an appropriate level for an extended life of the LED. Current limiting features can themselves present reliability issues in the distributed lighting assembly.

BRIEF DESCRIPTION OF THE INVENTION

A low voltage lamp assembly is provided that comprises a lamp housing comprising an optical axis and an illumination bore extending along the optical axis. The bore is adapted for receiving a light transmission member, and a low voltage light source is situated within the bore and is axially aligned with the optical axis.

Optionally, the light source comprises a light emitting diode, and a bushing is positioned within the bore and surrounds a portion of the diode. First and second wires extend from the lamp assembly for establishing an electrical connection to the light source. The first and second wires are bonded to the lamp housing to create a seal therewith, and a current limiting resistor is coupled to one of the wires within a strain relief pod separated from the lamp housing.

In accordance with another aspect of the present invention, a low voltage lamp assembly is provided that comprises an illumination bore extending along an optical axis and is adapted for receiving a light transmission member. A bushing is situated within the bore, and a low voltage light source is situated within the bushing and is axially aligned with the optical axis.

In accordance with another aspect of the present invention, a distributed lighting assembly is provided that includes at least one low voltage lamp assembly comprising a lamp housing. The lamp housing comprises a bore extending along an optical axis, and a light emitting diode is situated within the bore and is axially aligned with the optical axis. A strain relief pod is separated from the housing, and the pod comprises a current limiter therein.

DETAILED DESCRIPTION OF THE INVENTION

Figure 1:
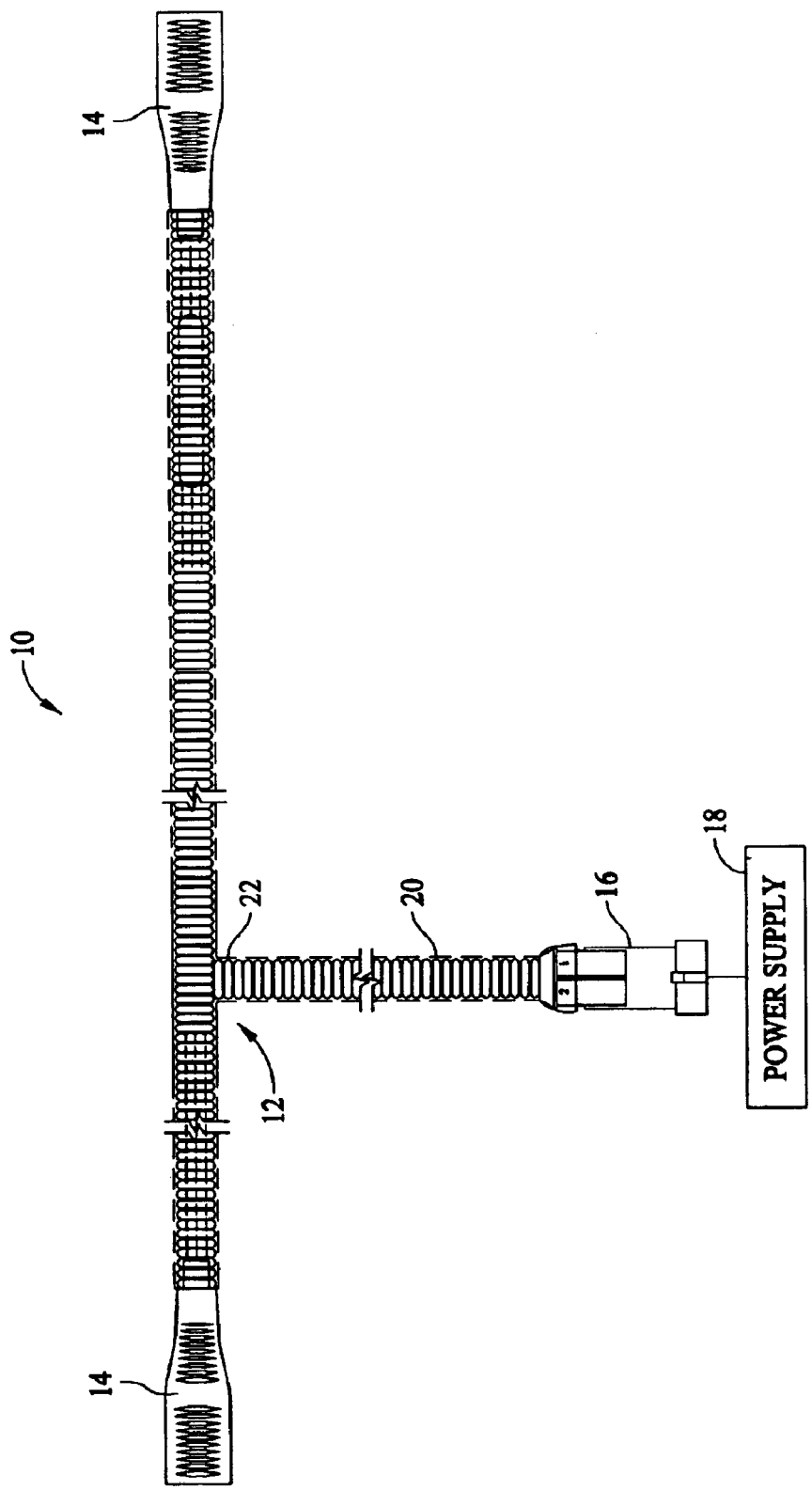
FIG. 1 is a top plan view of a distributed lighting assembly including lamp assemblies formed in accordance with an exemplary embodiment of the invention.

FIG. 1 is a top plan view of an exemplary distributed lighting assembly 10 generally including a wiring harness 12 coupled to a number of lamp assemblies 14. Wiring harness 12 includes a connector 16 configured for establishing an electrical connection to a known power supply 18 for energizing lamp assemblies 14 as desired. Wiring harness 16 includes a corrugated tube 20 surrounding portions of lamp assemblies 14 and electrical wires (not shown in FIG. 1) extending between connector 16 and lamp assemblies 14. As such, and by virtue of the corrugations in tube 20, tube 20 may be flexibly positioned to facilitate installation of lighting assembly 10. In an illustrative embodiment, connector 16 of wiring harness 12 is connected to a vehicle wiring harness powered by a battery of the vehicle. Switches in the door complete an electrical path to the battery to energize lamp assemblies 14 only when the doors of the vehicle are opened. As such, lighting assembly 10 may be used to light vehicle running boards, or for other interior or exterior illumination of a vehicle. It is understood, however, that the benefits of lamp assembly 10 may accrue to a variety of other applications in lieu of vehicle illumination.

As explained in detail below, lamp assemblies 14 include low voltage light sources (not shown in FIG. 1), such as light emitting diodes (LED)'s. Even light is generated from lamp assemblies 14, while avoiding assembly and installation difficulties to which the low voltage light sources are susceptible. In addition, lamp assemblies 14 are adapted to withstand demanding operating environments for the reasons set forth below.

In the illustrated embodiment, two lamp assemblies 14 are included in distributed lighting assembly 10. As illustrated in FIG. 1, the lamp assemblies 14 are oriented in generally opposite directions on either side of a T-branch 22 in wiring harness 12 so that lamp assemblies 14 are generally aligned along a common axis. It is appreciated, however, that the wiring harness 12 is flexible so that the lamp assemblies 14 may be mounted in various positions relative to one another. When light pipes (not shown in FIG. 1 but described below) are coupled to respective lamp assemblies 14, lamp assemblies 14 provide a stream of even light along a length of the light pipe extending from each of lamp assemblies 14. It is recognized that in alternative embodiments, distributed light assembly 10 may include greater than two lamp assemblies 14 in virtually any orientation desired. In addition, it is understood that lamp assemblies 14 may be used as stand alone illumination components without the use of wiring harness 12. Therefore, the foregoing embodiments of distributed light assembly are provided for purposes of illustration rather than limitation, and it is not intended that lamp assemblies 14 be restricted to a particular application, with or without a wiring harness 12.

Figure 2:
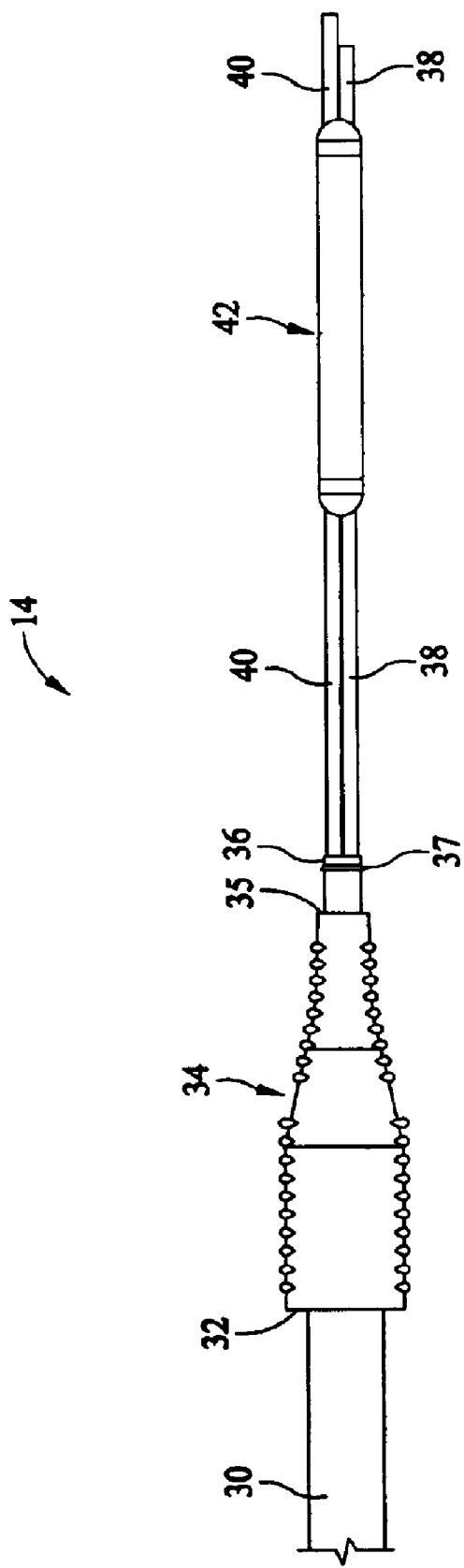
FIG. 2 is a plan view of an exemplary lamp and light pipe assembly for the distributed lighting assembly shown in FIG. 1.

FIG. 2 is a plan view of a lamp assembly 14 removed from wiring harness 12 and illustrating a known light transmission member 30 coupled thereto and extending from a forward or anterior end 32 of a lamp housing 34. In an exemplary embodiment, light transmission member 30 is a light pipe, light transmitting strip, or lighting strip adapted to illuminate an elongate area between opposite ends thereof so that the light intensity along the length of the elongate area is approximately constant or uniform and the light levels at each location along the light pipe is comparable regardless of the distance from the light source (explained below) situated in lamp housing 34. One such light transmission member 30 is described in U.S. Pat. No. 6,095,673 which is hereby incorporated by reference in its entirety, although it is appreciated that other known light transmission members 30 may be employed in lamp assembly 14 without departing from the scope of the present invention.

Also, as illustrated in FIG. 2, lamp housing 34 includes a posterior or rearward end 35 from which a connector portion 36 extends. Connector portion 36 includes an annular lip 37 that matingly engages with a corrugation of wiring harness tube 20 (shown in FIG. 1). Positive and negative wires 38, 40 extend from connector portion 36 for illuminating the light source in lamp housing 34. In an exemplary embodiment, wires 38, 40 are automotive grade wires including an outer insulation that is suitable for a vehicle environment, although in alternative embodiments other grades of wires may likewise be employed.

An elongated strain relief pod 42 is coupled to positive and negative wires 38, 40 at a predetermined distance from rearward end 36 of lamp housing 34. Positive and negative wires 38, 40 are flexible between lamp housing 34 and strain relief pod 42 to facilitate installation of lamp assembly 14 in a desired location. Wires 38, 40 extend from an end of strain relief pod 42 opposite lamp housing 34 and ultimately are coupled to a connector, such as connector 16 (shown in FIG. 1) for establishing an electrical connection to a power source 18 (shown in FIG. 1). Alternatively, wires 38, 40 may be directly coupled to a power source for energizing the lamp assembly 14 as desired.

Figure 3:
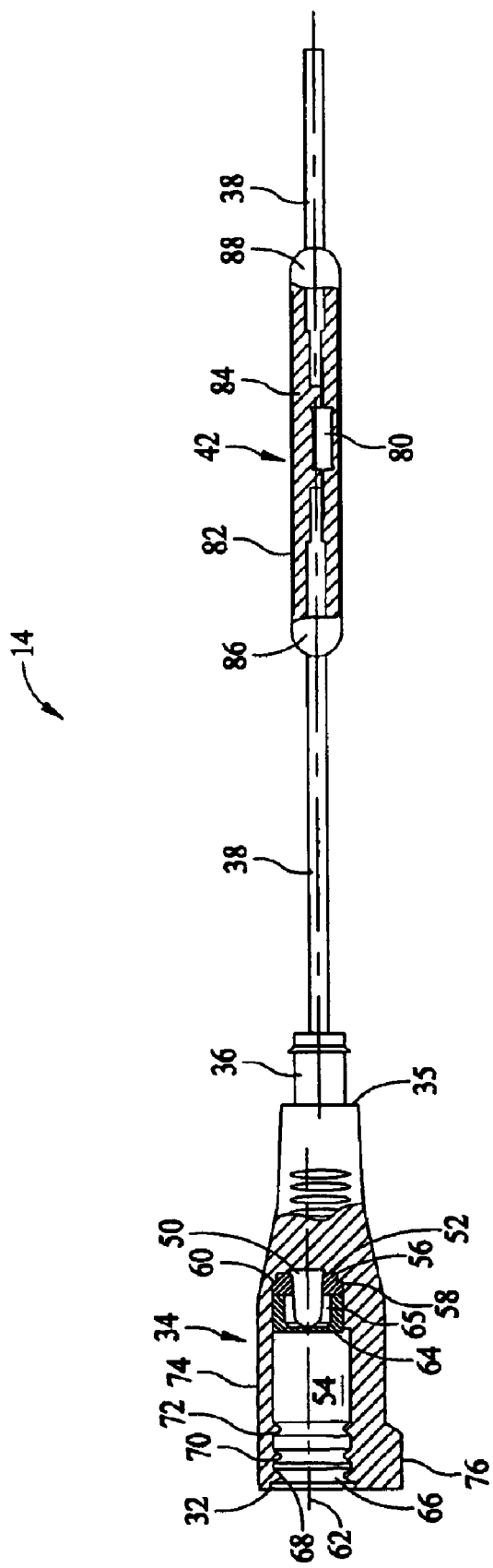
FIG. 3 is a partial cross sectional view of the lamp assembly shown in FIG. 2.

FIG. 3 is a partial cross sectional view of lamp assembly 14 illustrating a low voltage light source 50 situated in a proximal end 52 of an illumination bore 54 extending inward from anterior end 32 of lamp housing 34. In an exemplary embodiment, light source 50 is a known light emitting diode (LED), although it is appreciated that other known low voltage light sources familiar to those in the art (e.g., incandescent printed circuit board lights, compact illuminators, electro-luminescent devices, and the like) may likewise be employed as light sources in alternative embodiments.

A lower end of light source 50 is received in a bushing 56 including a positioning collar 58 that is seated on a shelf 60 in bore 54. Bushing 56 ensures correct positioning of light source 50 within bore 54 and maintains light source 50 in substantial alignment with an optical axis 62 of lamp housing 34. In addition, bushing 56 provides a sealed interface between an interior of bore 54 and outer surfaces of the bushing, thereby protecting the LED leads (not shown in FIG. 3) from corrosive agents (gas, liquid, or solid) that lamp assembly 14 may be subjected to in use.

In an exemplary embodiment, a light filter element 64 is inserted over light source 50 within bore 54. Filter element 64 in one embodiment is cup shaped and includes sides extending around an outer surface of light source 50 and adjacent to interior surfaces of bore 54. An end of filter element 64 extends transversely across the bore 54 along the upper edges of the sides, and the end of the filter element receives a top surface of light source 50. Filter element 64 is employed to change the color of the output light emanating from lamp assembly 14. It is understood that other filter elements could be employed to produce various colors or intensities of light emanating from lamp assembly 14. In addition, it is recognized that filter element 64 need not be present to achieve the advantages of the invention, and filter element 64 is therefore optional.

In an exemplary embodiment, an air pocket 65 surrounds outer surfaces of light source 50 that extend from bushing 56. It is contemplated, however, that light index adjusting gels and the like may be employed in lieu of air pocket 65 to further enhance or refine light emanating from light source 50 and to reduce reflection of light at an inlet of the light transmission member 30.

An open end 66 of bore 54 includes irregularly spaced interior rings 68, 70, 72 projecting inwardly toward optical axis 62. Rings 68, 70, 72 assist in positioning of a light transmission member 30 (FIG. 2) and exert pressure thereupon to grip an outer surface of the light transmission member received in bore 54. Rings 68, 70, 72 thereby form a sealed engagement between lamp housing 34 and the light transmission member. When an end of light transmission member 30 (shown in FIG. 2) is inserted into bore 54 from lamp housing anterior end 32 until an end of the light transmission member is located proximate a tip of the light source 50, light emanating from light source 50 is directed into the light transmission member 30 which produces an elongated stream of even light. By virtue of rings 68, 70, 72 and bushing 56, light source 50 and the light transmission member 30 are substantially aligned along optical axis 62 to produce optimal light output from the light transmission member.

An outer surface 74 of lamp housing 34 is contoured and tapered to a smaller dimension rearward of light source 50. An alignment key 76 extends outwardly from outer surface 74 of lamp housing 34 adjacent anterior end 32 and ensures correct alignment of lamp housing 34 when lamp assembly 14 is installed. A substantially constant diameter connector portion 36 extends from posterior end 35 of lamp housing, and positive wire 38 extends therefrom.

In an illustrative embodiment, lamp housing 34 is formed integrally with connector portion 36 according to a known molding operation. More specifically, in one embodiment light source 50 and bushing 56 are overmolded with a thermoplastic chlorinated etheylene alloy to encase light source 50 therein as illustrated in FIG. 3. As such, lamp housing 34 is impact resistant and chemically resistive to corrosive agents, including but not limited to motor oil, transmission fluid, antifreeze, road salt, water and other fluids and solids that may be encountered in a vehicle environment. Additionally, thermoplastic chlorinated etheylene alloy has been found to form a sufficient bond with positive and negative wires 38, 40 to provide a sealed interface between the wires and the lamp housing. Bonding of wires 38, 40 with connector portion 36 also provides a strain relief feature that prevents connections of wires 38, 40 to the light source leads from being pulled apart as lamp assembly 14 is installed. Of course, it is understood that lamp housing 34 may be fabricated from other materials suitable for other applications in alternative embodiments.

In an exemplary embodiment, bushing 56 is separately provided from lamp housing 34 and fabricated according to a molding operation utilizing the same or different materials as lamp housing 34. Bushing 56 is substantially rigid and serves to position and maintain light source 50 within the mold as lamp housing 50 is formed such that light source 50 is substantially aligned with optical axis 62. In further and/or alternative embodiments, bushing 56 may be integrated into lamp housing 34, and bushing 56 and light source 50 may be inserted into housing 34 after housing is formed.

As also illustrated in FIG. 3, strain relief pod 42 includes a current limiting resistor 80 therein that is electrically coupled to stripped portions of positive wire 38 according to a known process, such as crimping, welding, soldering or the like. Resistor 80 is selected to reduce current flowing to light source 50 to a sufficient level to produce an adequate amount of light, while achieving an adequate working life of light source 50. For example, in one embodiment wherein lamp assembly 14 is intended to illuminate a vehicle running board, resistor 80 is selected so that an LED light source is energized to produce about 200 foot candle illumination, thereby producing a rated life of the LED of about 500 hours of illumination. It is recognized that greater or lesser illumination output and rated lifespans for light source 50 may be achieved by varying the current flow to light source 50. It is further understood that other known current limiting features may be employed in lieu of resistor 80 to control current flow to light source 50.

Resistor 80 is encased in a rigid tube 82 to prevent bending of the wire coupled to resistor 80 and compromising the electrical connection thereto. Additionally, by locating resistor 80 in pod 42, heat generated in resistor 80 as current flows therethrough is isolated from light source 50. Heat transfer from resistor 82 to light source 50 which can shorten the operable life of light source 50 is therefore avoided. Tube 82, wire 38 and resistor 80 are overmolded with a known material 84 to seal the resistor connection. In an illustrative embodiment, tube 82 is a polyvinyl chloride (PVC) tube, and material 84 is a thermoplastic chlorinated etheylene alloy having the aforementioned impact resistance and chemical resistance suitable for vehicle applications, and is further bonded to wire 38 to form a sealed connection therewith. Specifically, and as illustrated in FIG. 3, rounded anterior and posterior ends 86, 88 are formed on the ends of tube 82 in molding operations.

Figure 4:
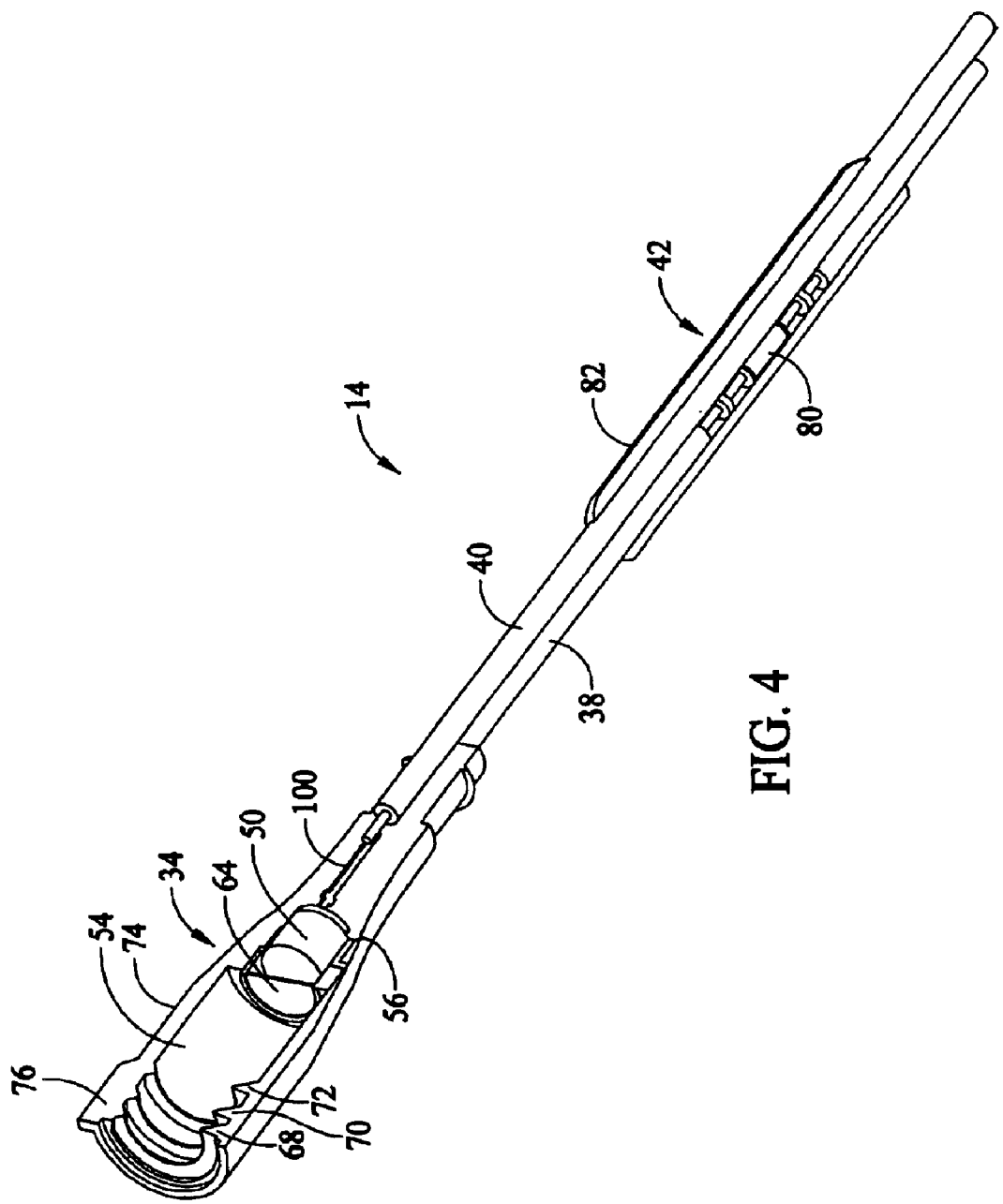
FIG. 4 is a perspective broken away view of the lamp assembly shown in FIGS. 2 and 3.

FIG. 4 is a perspective broken away view of lamp assembly 14 illustrating a light source lead 100 extending from beneath light source 50 in lamp housing 34. A portion of negative wire 40 is stripped of surrounding insulation and electrically coupled to lead 100 according to known process and techniques, including but not limited to crimping welding, soldering, and other known methods familiar to those in the art. While not shown in FIG. 4, positive wire 38 is also attached to a lead from light source 50 in a similar fashion.

Bushing 56 surrounds a lower portion of light source 50 and maintains light source 50 in position within lamp housing 34, and filter element 64 extends over the top of light surface 50. Rings 68, 70, 72 extend inwardly into bore 54, and alignment key 76 extends outwardly from an outer surface 74 of lamp housing 34.

Current limiting resistor 80 is coupled to positive wire 38 within rigid tube 82 of strain relief pod 42. As is evident from FIG. 4, negative wire 40 passes straight through pod 42 and does not include a resistor or current limiting element. It is appreciated that in an alternative embodiment the resistor 80 could be coupled to the negative wire 40 and the positive wire 38 could pass straight through the pod 42 to achieve the same effect and advantages as the illustrated embodiment.

Figures 5, 6:
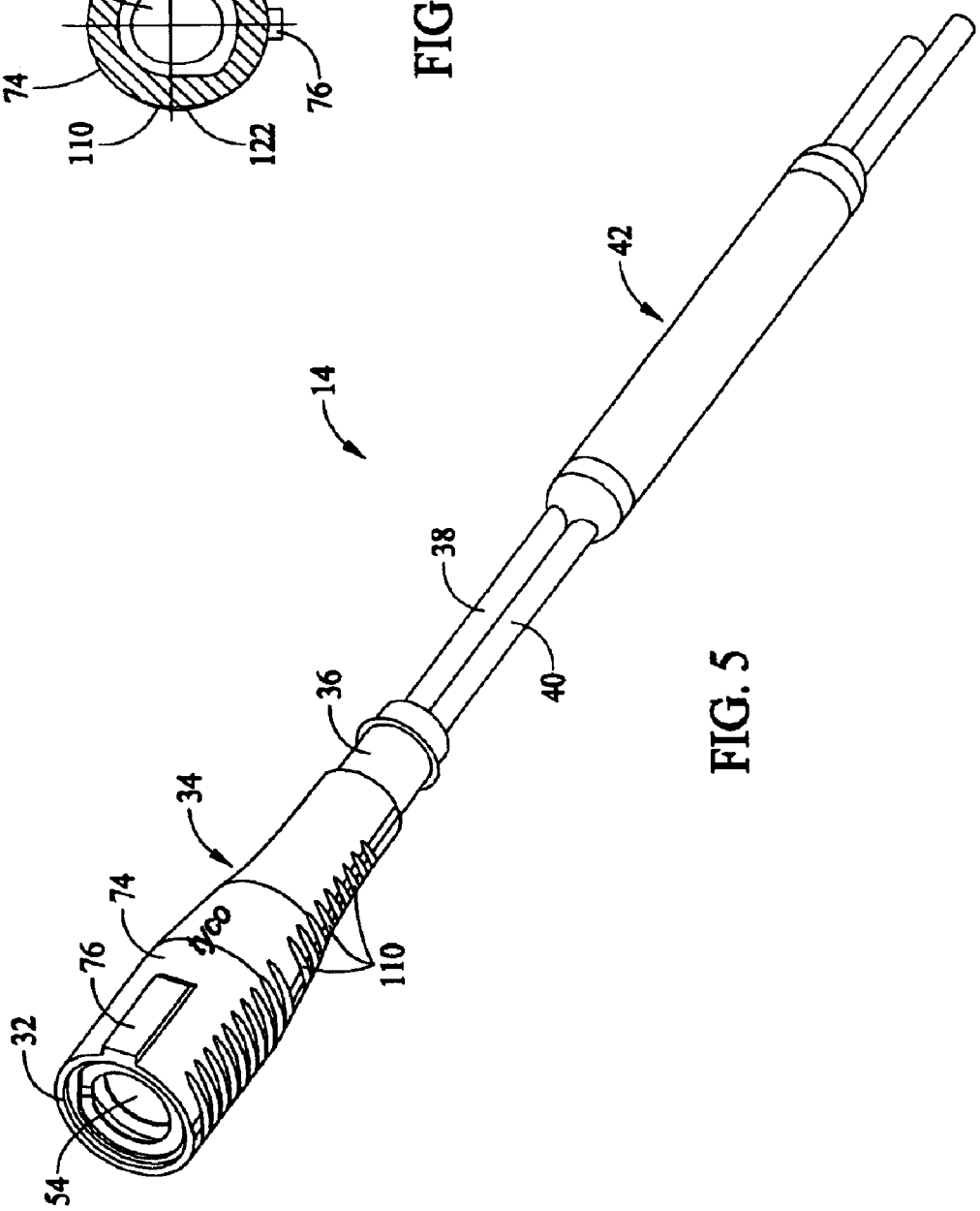
FIG. 5 is a perspective view of the lamp assembly shown in FIGS. 2–4.
FIG. 6 is a cross sectional view of the lamp assembly shown in FIG. 5.

FIG. 5 is a perspective view of lamp assembly 14 fully assembled. Bore 54 of lamp housing 34 is open at anterior end 32 and forms a receptacle for a light transmission member. Alignment key 76 extends outwardly from outer surface 74 of lamp housing 34, and finger grips 110 are formed on outer surface 74 to facilitate positioning of lamp housing 34 during installation.

Connector portion 36 extends from lamp housing 34, and lip 37 extends outwardly therefrom for engagement with wiring harness tube 20 (shown in FIG. 1). Wires 38, 40 extend therefrom and include flexible insulation such that wires 38, 40 may be bent between rigid lamp housing 34 and rigid strain relief pod 42. Separation of connector portion 36 and pod 42 facilitates flexibility during installation of lamp assembly 14 as well as provides additional strain relief to internal connection of wires 38, 40 within lamp housing 34 and/or pod 42.

FIG. 6 is a cross sectional view of lamp housing 34 taken along a plane substantially perpendicular to optical axis 62 (shown in FIG. 3) through anterior end 32 of lamp housing 34. Outer surface 74 of lamp housing includes flats 120, 122, and finger grips 110 extend outwardly from flats 120, 122. Moreover, it is seen from FIG. 6 that bore is oblong in shape and flattened on lateral sides thereof. The shape of bore 54 generally conforms to an outer shape of the light transmission member inserted therein. It is recognized that other shapes may be employed in bore 54 to accommodate other light transmission members. Ring 68 is seen extending inwardly into bore 54, and alignment key 76 extends outwardly from outer surface 74 and is generally located substantially equidistant from and extends substantially parallel to flats 120, 122. Flats 120, 122 and key 76 facilitate precise positioning of lamp assembly during installation to a mating surface, and prevent incorrect alignment of lamp housing 34.

A cost effective lamp assembly is therefore provided that may be fabricated in a straightforward manufacturing process. Uniform light transmission is achieved by ensuring that light source 50 (shown in FIGS. 3 and 4) is substantially aligned with an optical axis 62 (shown in FIG. 3) that is generally coincident with a transmission axis of a light transmission member in use. An impact and chemically resistant housing is provided that is suitable for demanding operating environments, and strain relief and current limiting features are provided for increased reliability and adequate life expectancy of the assembly. When lamp assemblies are installed into distributed lighting assemblies, for all the above reasons it is respectfully submitted that a cost effective and reliable alternative to known distributed light assemblies is provided.

While the invention has been described in terms of various specific embodiments, those skilled in the art will recognize that the invention can be practiced with modification within the spirit and scope of the claims.

What is claimed is:

1. A low voltage lamp assembly comprising:
   a lamp housing having an optical axis and an illumination bore extending along said optical axis, said housing adapted for receiving a light transmission member; and
   a low voltage light source situated within said bore and axially aligned with said optical axis, wherein said lamp housing constitutes an overmolded elastomer enclosing said light source and defining an alignment key extending from an outer surface thereof.

2. A lamp assembly in accordance with claim 1 wherein said light source comprises a light emitting diode.

3. A lamp assembly in accordance with claim 1 further comprising a bushing positioned within said bore and surrounding a portion of said light source.

4. A lamp assembly in accordance with claim 1 further comprising wires extending from said lamp assembly for establishing an electrical connection to said light source, being bonded to said lamp housing to create a seal therewith.

5. A lamp assembly in accordance with claim 1 further comprising wires extending from said lamp assembly for establishing an electrical connection to said light source, and a strain relief pod provided separate from said housing and bonded to said wires.

6. A lamp assembly in accordance with claim 1 further comprising a strain relief pod connected in series with said light source through a flexible wire.

7. A lamp assembly in accordance with claim 1 further comprising a current limiting resistor connected in series with said light source through an intermediate section of wire, said wire being flexible with respect to said housing.

8. A lamp assembly in accordance with claim 1 further comprising a strain relief pod distanced from said housing and attached in series with said light source through wires, said strain relief pod comprising a tube encasing overmolded portions of said wire.

9. A lamp assembly in accordance with claim 1 further comprising a color filter element disposed adjacent said low voltage light source.

10. A low voltage lamp assembly comprising:
    a lamp housing comprising an illumination bore extending along an optical axis and adapted for receiving a light transmission member, said bore comprising a shelf;
    a bushing situated within said bore, said bushing comprising a collar and sealingly engaged to said shelf; and
    a low voltage light source situated within said bushing and axially aligned with said optical axis.

11. A low voltage lamp assembly in accordance with claim 10 wherein said light source comprises a light emitting diode.

12. A low voltage lamp assembly in accordance with claim 10 further comprising wires joining said light source with a strain relief pod separated from said lamp housing.

13. A low voltage lamp assembly in accordance with claim 10 further comprising a current limiter connected in series with said light source, said current limiter being held in strain relief pod located remote from said lamp housing.

14. A low voltage lamp assembly in accordance with claim 10, said lamp housing comprising an outer surface, said outer surface comprising an alignment key extending therefrom.

15. A distributed lighting assembly comprising:
    at least one low voltage lamp assembly comprising a lamp housing, said lamp housing having a bore extending along an optical axis;
    a light emitting diode situated within said bore and axially centered and aligned along said optical axis; and
    a strain relief pod located remote from said housing, said strain relief pod comprising a current limiter therein connected in series with said light emitting diode.

16. A lighting assembly in accordance with claim 15 further comprising wires extending from said light emitting diode and coupled to respective contact leads extending therefrom, said wires being received in said strain relief pod, one of said wires being electrically coupled to said current limiter.

17. A lighting assembly in accordance with claim 16 wherein said lamp housing is overmolded upon said light emitting diode and bonded to said wires.

18. A lighting assembly in accordance with claim 15 wherein said strain relief pod comprises a rigid tube that is overmolded with a thermoplastic material.

19. A lighting assembly in accordance with claim 15 further comprising a light transmission member coupled to said lamp assembly and extending from said bore.

* * * * *